United States Patent [19]

Bott

[11] Patent Number: 5,082,158
[45] Date of Patent: Jan. 21, 1992

[54] ARTICLE CARRIER

[76] Inventor: John A. Bott, 931 Lakeshore Dr., Grosse Pointe Shores, Mich. 48236

[21] Appl. No.: 540,879

[22] Filed: Jun. 20, 1990

Related U.S. Application Data

[63] Continuation of Ser. No. 246,771, Sep. 20, 1988, abandoned.

[51] Int. Cl.⁵ .................................................. B60R 9/00
[52] U.S. Cl. ..................................... 224/321; 224/326
[58] Field of Search ................ 224/326, 325, 315, 321, 224/329, 330, 331, 309, 324, 323; 410/104, 105, 113, 150; 248/503

[56] References Cited

U.S. PATENT DOCUMENTS

| | | |
|---|---|---|
| Re. 26,539 | 3/1969 | Bott ..................... 224/326 |
| 3,064,868 | 11/1962 | Treydte ................ 224/330 |
| 3,554,416 | 1/1971 | Bott ..................... 224/321 |
| 4,099,658 | 7/1978 | Bott . |
| 4,133,465 | 1/1979 | Bott . |
| 4,162,755 | 7/1979 | Bott . |
| 4,170,322 | 10/1979 | Bott ..................... 224/326 |
| 4,182,471 | 1/1980 | Bott . |
| 4,274,570 | 6/1981 | Bott . |
| 4,295,587 | 10/1981 | Bott . |
| 4,323,182 | 4/1982 | Bott . |
| 4,364,500 | 12/1982 | Bott . |
| 4,406,386 | 9/1983 | Rasor et al. ......... 224/321 |
| 4,431,123 | 2/1984 | Bott . |
| 4,473,178 | 9/1984 | Bott . |
| 4,496,089 | 1/1985 | Eklund ................. 224/321 |
| 4,500,020 | 2/1985 | Rasor ................... 224/326 |
| 4,516,710 | 5/1985 | Bott . |
| 4,684,048 | 8/1987 | Bott . |
| 4,754,905 | 7/1988 | Bott . |

OTHER PUBLICATIONS

Copending Application Ser. No. 07/246,770, filed Sep. 20, 1988, John A. Bott, Article Carrier.
Copending Application Ser. No. 07/246,648, filed Sep. 20, 1988, John A. Bott, Article Carrier.
Copending Application Ser. No. 07/253,503, filed Oct. 5, 1988, John A. Bott, Article Carrier.
Copending Application, Attorney Docket No. 0210A-00172, mailed Dec. 9, 1988, John A. Bott, Design: Article Carrier.

*Primary Examiner*—Linda J. Sholl
*Attorney, Agent, or Firm*—Harness, Dickey & Pierce

[57] ABSTRACT

The present invention is an article carrier for an automobile including two side rails fixedly secured on a generally horizontal extending exterior automobile body surface. The side rails extend generally longitudinally of the automobile. A pair of bracket members are disposed on the side rails and a cross bar extends laterally between and secured adjacent its opposite ends to the bracket members. A means on each of the article securing members cooperate with the side rails for detachably securing and longitudinally adjusting the cross bar upon the side rails.

16 Claims, 4 Drawing Sheets

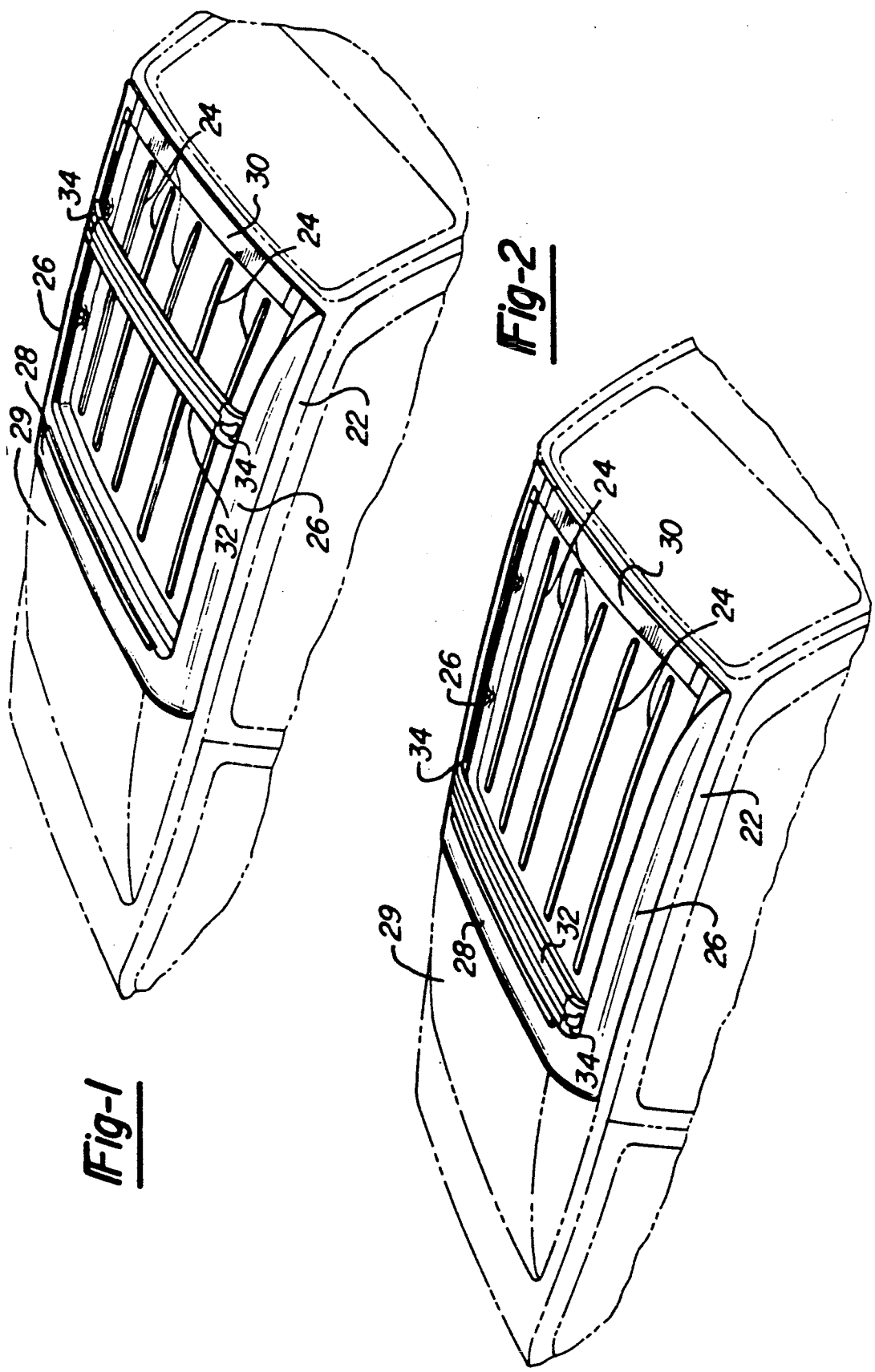

ARTICLE CARRIER

This is a continuation of U.S. Pat. application Ser. No. 246,771, filed Sept. 20, 1988, now abandoned.

BACKGROUND OF THE INVENTION

1. Field of the Invention

The present invention relates to an article carrier for automotive vehicles, more particularly, to an adjustable cross bar for an article carrier on an automotive vehicle.

2. Description of Related Art

Automobile luggage racks frequently employ two separate subassemblies or portions: a rectangular framework which surrounds the load to be carried and a plurality of slats which rest on the roof or other automobile body surface and carries the weight of the load. In such constructions, the framework and the slats are often secured to the automobile body independently of one another. In still another automobile luggage or article carrier, a cross bar replaces the framework as a means for confining the luggage upon the slats.

In my prior U.S. Pat. No. 4,182,471, I disclosed an article carrier for automotive vehicles having crossbars which can be adjusted on the slats and are easily removed, interchanged or adjusted in position on the slats in accordance with the needs of the user. This construction has achieved significant commercial success. Nevertheless, some problems have been experienced in providing an aesthetically pleasing and more simple to use rack. Therefore, it is believed that a need exists for a cross bar which has an attractive appearance of modern luggage carriers but which possesses a degree of adjustability and ease of operation.

SUMMARY OF THE INVENTION

The present invention is an article carrier for an automobile including two side rails fixedly secured on a generally horizontal extending exterior automobile body surface. The side rails extend generally longitudinally of the automobile. A pair of bracket members are disposed on the side rails and a cross bar extends laterally between and secured adjacent its opposite ends to the bracket members. A means on each of the article securing members cooperate with the side rails for detachably securing and longitudinally adjusting the cross bar upon the side rails.

One advantage of the present invention is a cross bar which is attractive in appearance and has a greater degree of adjustability and ease of operation. Another advantage of the present invention is a cross bar which can be adjusted infinitely along the length of the side rails.

Still another advantage of the present invention is that the cross bar nests with the front rail member when not in use to provide a more aesthetically pleasing and aerodynamically efficient article carrier.

BRIEF DESCRIPTION OF THE DRAWINGS

FIG. 1 is a fragmentary perspective view of an automobile showing an article carrier mounted thereon which is constructed in accordance with the principles of the present invention;

FIG. 2 is a view of the structure similarly illustrated in FIG. 1 showing the cross bar unnested;

DESCRIPTION OF THE PREFERRED EMBODIMENT

Figure 3:
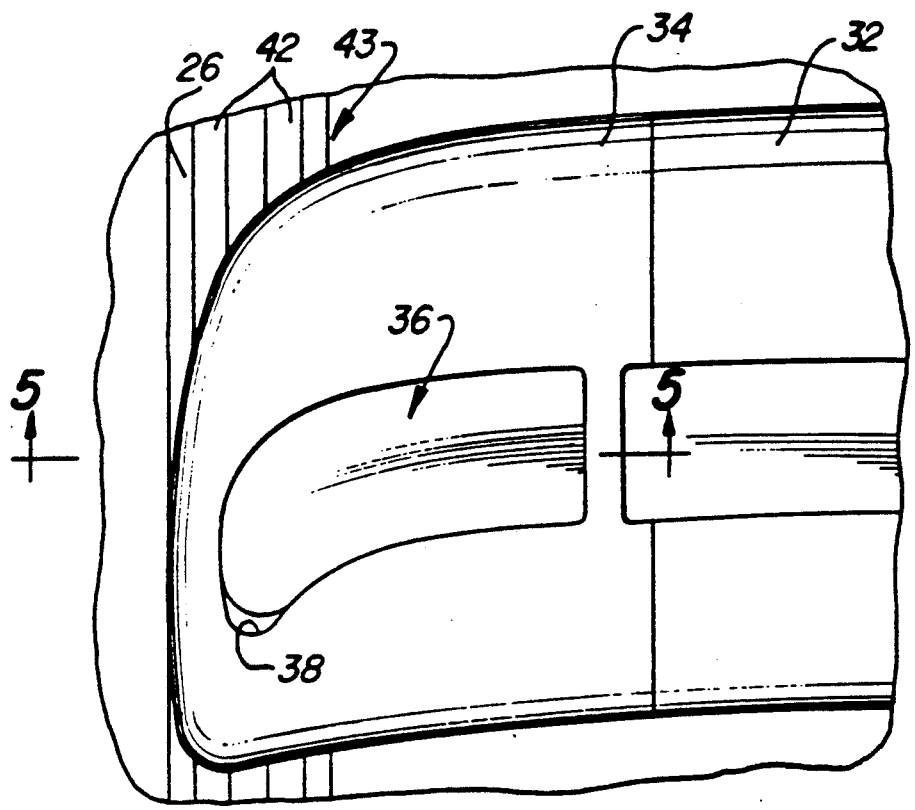
FIG. 3 is an enlarged plan view of a portion of the structure illustrated in FIG. 2 taken in the direction of arrow 3.

FIGS. 1 and 2 depict an automobile 20 having a roof 22 on which are mounted a plurality of identical, parallel, transversely spaced slats 24. Although the slats 24 are shown mounted on the roof 22, the article carrier of the present invention may be mounted with equal utility on an automobile trunk lid or any other generally horizontal exterior body portion of an automobile. The slats 24 are secured on the roof 22 by means of sheet metal screws (not shown). The article carrier also includes a pair of parallel, transversely spaced side rails 26. Each of the side rails 26 are disposed on the other side of the outermost slat 24 such that the slats 24 are transversely spaced between the side rails 26. A front rail member 28 is disposed between and generally perpendicular to the front ends of the side rails 26 and has a configuration that cooperates with the aerodynamic shape of a glass airfoil 29. A rear rail member 30 is disposed between and generally perpendicular to the rear ends of the side rails 26. The side rails 26 and members 28 and 30 are secured on the roof 22 by means of sheet metal screws (not shown). Mounted on the side rails 26 is a tubular restraining or cross bar 32 which is fitted at its opposite ends onto brackets 34. As illustrated in FIG. 2, the cross bar 32 nests with the front rail member 28 when not in use or in a stowed position. This presents a more aesthetically appealing and aerodynamically efficient article carrier.

Referring to FIG. 3, the bracket 34 includes a locking member 36 for locking the cross bar 32 into position along the side rail 26. The locking member 36 allows the cross bar 32 to be positioned operably at any location or infinitely along the length of the side rail 26. When not in use, the locking member 36 is pivotally disposed to a generally horizontal position to be stored within a cavity or pocket 38 of the bracket 34 as illustrated in FIG. 5.

Figure 4:
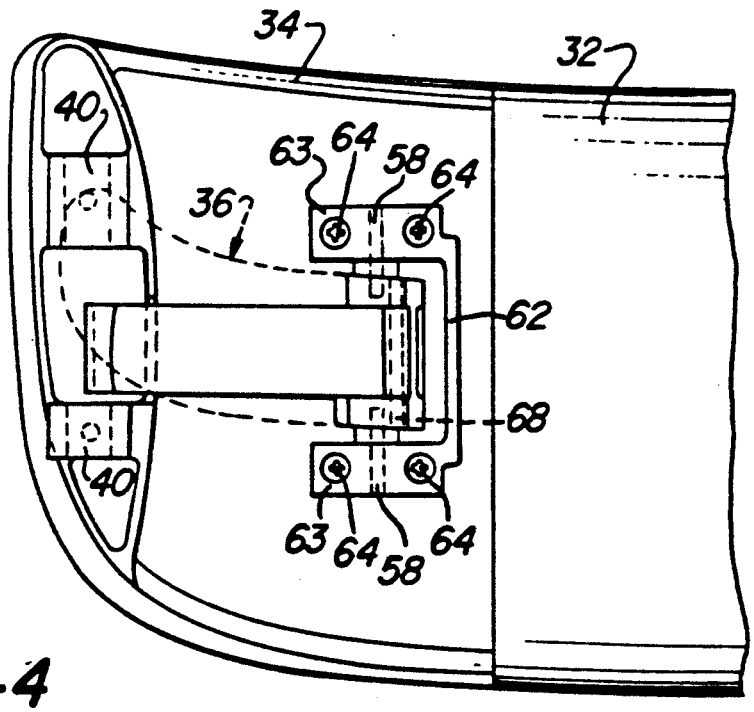
FIG. 4 is a bottom view of the structure illustrated in FIG. 3.

Referring to FIG. 4, the cross sectional configuration of the bracket 34 is generally elliptical. The bracket 34 includes a pair of longitudinally spaced feet 40 at the bottom thereof which slide along the upper supporting surface 42 of the side rail 26. The feet 40 have a configuration similar to an inverted "T".

Figure 5:
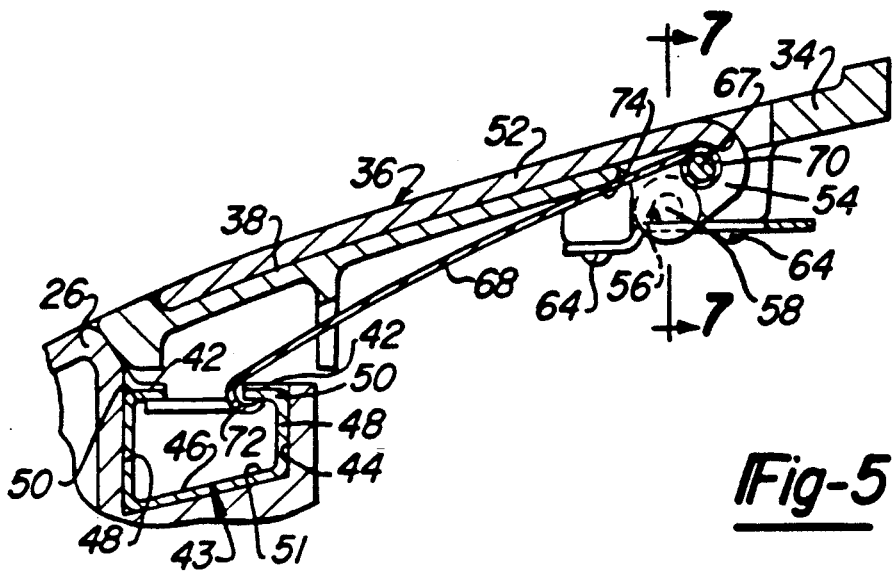
FIG. 5 is a sectional view of the structure illustrated in FIG. 3 taken along line 5—5 thereof showing a locking member in a closed position.

Referring to FIG. 5, the side rail 26 includes a channel member 43 disposed in a longitudinally extending groove or first channel 44 formed in the side rail 26. The channel member 43 comprises a bottom wall 46 and a pair of generally parallel upwardly extending side walls 48 with inwardly extending ledges 50 at the upper ends of the side walls 48. The upper supporting surface 42 is part of the ledge 50. The bottom 46 and side 48 walls form an upwardly opening second channel 51 which is wider at its bottom than at the top.

Figure 6:
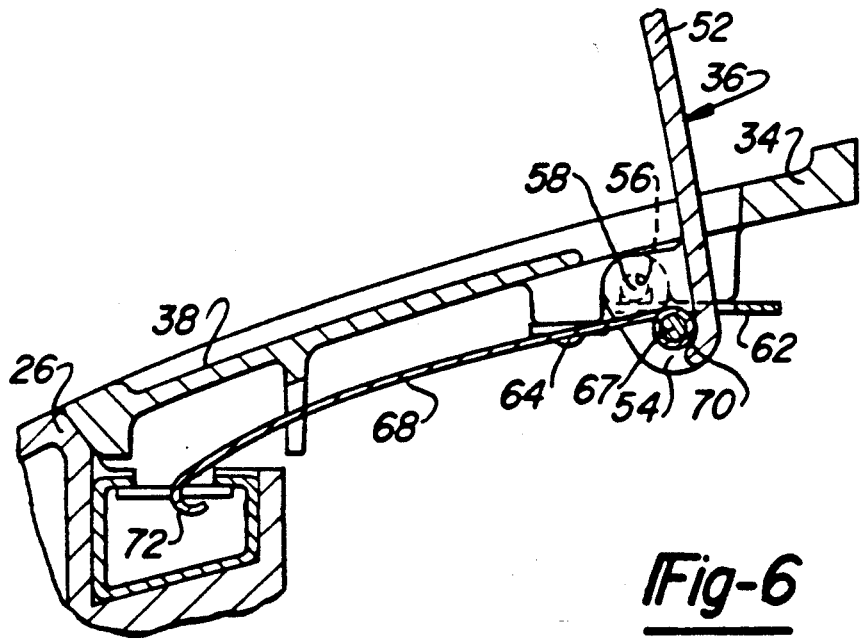
FIG. 6 is a view of the structure similarly illustrated in FIG. 5 showing the locking member in an open position.
Figure 7:
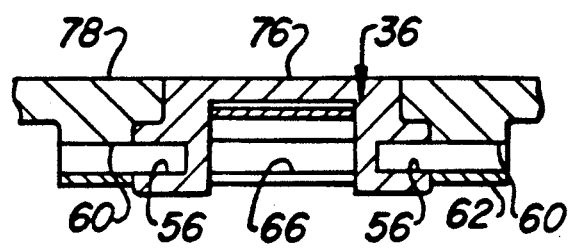
FIG. 7 is a sectional view of the structure illustrated in FIG. 5 taken along line 7—7 thereof.

The locking member 36 comprises a wall portion 52 and a base portion 54 at one end of the wall portion 52. The base portion 54 includes means forming a pair of first apertures 56 in it and a pair of corresponding shafts 58 having one end disposed in the first pair of apertures 56. The pair of shafts 58 have another end disposed in corresponding second apertures 60 formed in the bracket 34 (FIG. 7). A retainer member 62 having longitudinally spaced arms 63 is secured by screws 64 to the bracket 34 such that each arm 63 retains a corresponding shaft 58 in the second apertures 60. The shaft 58 allows the locking member 36 to be manually moved or rotated from a closed locking position of FIG. 5 to an open unlocked position of FIG. 6.

The locking member 36 also includes means forming a third aperture 66 communicating transversely through the base portion 54. A second shaft 67 passes through the third aperture 66. A spring member 68 has one end 70 wrapped or disposed about the second shaft 66 and a U-shaped end 72 opposite the one end which cooperates with the ledge 50 on the channel member 43. The spring member 68 flexes to engage the ledge 50 and contact a shoulder portion 74 of the bracket 34 to secure the bracket 34 to the channel member 43 when the locking member 36 is in the closed position. As illustrated in FIG. 6, when the locking member 36 is moved to the open position, the U-shaped end of the spring member disengages the ledge 50 to allow the bracket 34 to slide along the channel member 43 of the side rail 26.

Referring to FIG. 7, the upper surface 76 of the locking member 36 is substantially flush or planar with the upper surface 78 of the bracket 34. This presents a smoother contour upper or outer surface of the bracket 34.

Figure 8:
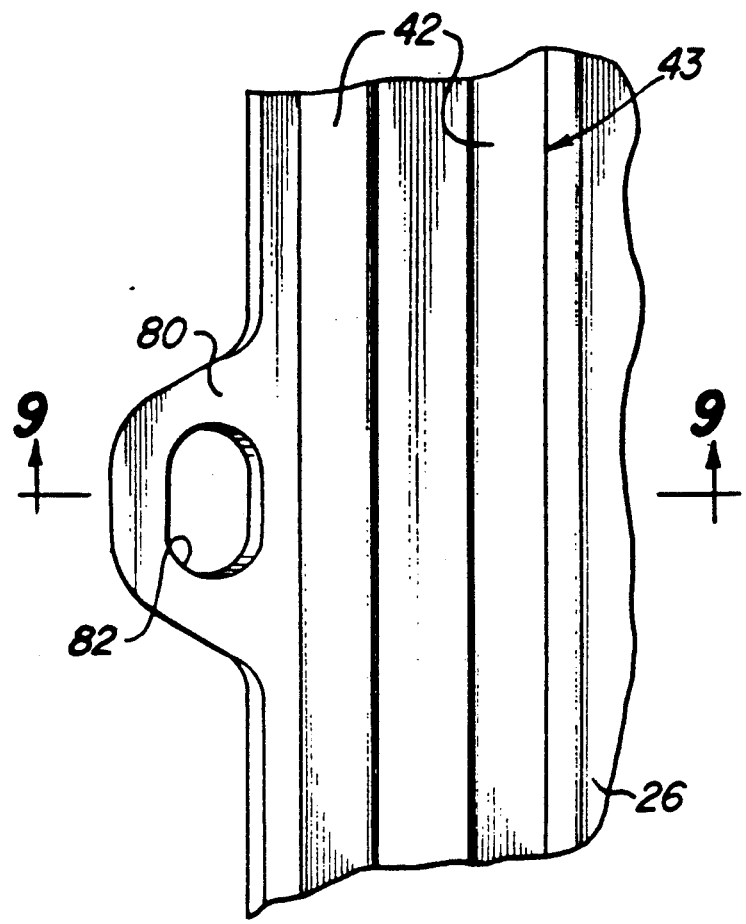
FIG. 8 is an enlarged plan view of a portion of the structure illustrated in FIG. 1 taken in the direction of arrow 8.
Figure 9:
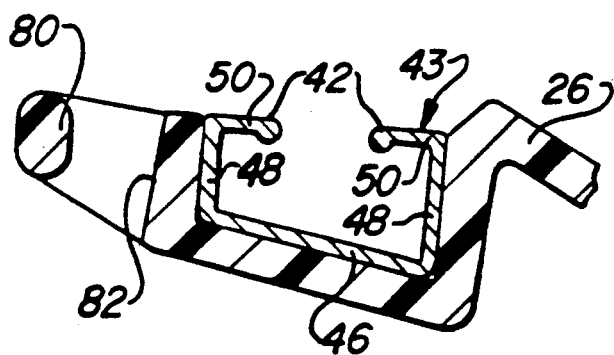
FIG. 9 is a sectional view of the structure illustrated in FIG. 8 taken along line 9-9 thereof.

FIGS. 8 and 9 depict an article securing or tie-down member 80 integrally formed or molded with the side rail 26. At least one tie-down member 80 is found along the side rail 26 and extends inwardly toward the opposing side rail 26. The tie-down member 80 includes an aperture or eyelet 82 to allow a rope or the like to pass therethrough for securing articles to the article carrier. Preferably, the eyelet 82 is elliptical in shape.

In operation, the locking member 36 secures the bracket 34 in a position along the channel member 43. An operator manually grasps the locking member 36 and moves it upward to an open position as illustrated in FIG. 6. The operator then slides the bracket 34 and cross bar 32 along the channel member 43. When the cross bar 32 is at a desired location, the operator pushes the locking member 36 toward the roof 22 of the vehicle to engage the end 72 with the ledge 50 to lock the bracket 34 in its position. The process may be repeated.

The present invention has been described in an illustrative manner. It is to be understood that the terminology which has been used is intended to be in the nature of words of description rather than of limitation.

Obviously, many modifications and variations of the present invention are possible in light of the above teachings. Therefore, within the scope of the appended claims, the present invention may be practiced otherwise than as specifically described.

I claim:

1. An article carrier for an automobile comprising:
   a plurality of slats fixedly secured on a generally horizontally extending exterior automobile body surface;
   said slats extending generally longitudinally of the automobile;
   a plurality of selected said slats having an upper article supporting surface;
   said supporting surfaces being located between the body surface and the lower side of articles on said carrier;
   a pair of bracket members disposed upon said selected slats and a restraining bar extending laterally between and secured adjacent its opposite ends to said bracket members;
   means on each of said bracket members and cooperable with one of said selected slats for detachably securing and longitudinally adjusting said bracket members and said restraining bar at infinite positions along said slats;
   said means comprising a locking member being manually rotatable in a direction transverse to said slat between a closed and an open position for locking and unlocking said bracket member at a position along said slat;
   rotating means for allowing said locking member to rotate between said open and closed positions; and
   an elongated spring member operatively connected to said locking member and extending transversely to said slat for movement as said locking member is rotated for engaging and disengaging said slat, said spring member being operable to flex to enable a portion thereof to abuttingly engage a shoulder portion of said bracket member to thereby further tension said bracket member in releasably locking engagement with said slat.

2. An article carrier as set forth in claim 1 wherein said bracket member includes means forming a pocket, said locking member being disposed in said pocket.

3. An article carrier as set forth in claim 2 wherein said locking member has a wall portion with an upper surface substantially flush with the upper surface of said bracket member and a base portion at one end of said wall portion.

4. An article carrier as set forth in claim 3 wherein said rotating means comprises at least one shaft, said base portion being disposed about said shaft.

5. An article carrier as set forth in claim 4 including retaining means for retaining said shaft to said bracket.

6. An article carrier as set forth in claim 1 wherein two of said slats comprise longitudinally extending channels.

7. An article carrier as set forth in claim 6 wherein said channels are of a generally inverted T-shaped configuration in transverse section.

8. An article carrier as set forth in claim 1 wherein at least selected of said slats are fabricated of a roll-formed material.

9. An article carrier for an automobile comprising:
   a plurality of parallel slats fixedly secured on a generally horizontally extending exterior automobile body surface;
   said slats extending generally longitudinally of the automobile;
   a plurality of selected said slats having an upper article supporting surface;
   said supporting surfaces being located between the body surface and the lower side of articles on said carrier;
   a pair of bracket members disposed upon said selected slats and a restraining bar extending laterally between and secured adjacent its opposite ends to said bracket members;

means on each of said bracket members and cooperable with one of said selected slats for detachably securing and longitudinally adjusting said bracket members and said restraining bar at infinite positions along said slats;

means comprising a locking member being manually rotated in a direction transverse to said slat between a closed and an open position for locking and unlocking said bracket member at a position along said slat;

rotating means for allowing said locking member to rotate between said open and closed positions;

said rotating means having a base portion and at least one first shaft, said base portion being disposed about said first shaft;

retaining means for retaining said first shaft to said bracket;

a second shaft spaced from said first shaft and connected to said locking member; and an elongated spring member having one end disposed about said second shaft and another end having a U-shaped portion for engaging and disengaging said slat as said locking member is rotated, said spring member being operable to flex to enable a portion thereof to abuttingly contact a portion of said bracket member to thereby further tension said bracket member in releasably locking engagement with said slat.

10. An article carrier as set forth in claim 9 wherein said plurality of slats comprises at least two slats.

11. An article carrier as set forth in claim 9 wherein said two said slats comprise longitudinally extending channels.

12. An article carrier as set forth in claim 11 wherein said channels are upwardly opening.

13. An article carrier as set forth in claim 9 wherein said channels are of a generally inverted T-shaped configuration in transverse section.

14. An article carrier as set forth in claim 9 including at least one article securing member extending inwardly from said slat.

15. An article carrier for an automobile comprising:

a plurality of parallel slats fixedly secured on a generally horizontally extending exterior automobile body surface;

said slats extending generally longitudinally of the automobile;

a plurality of selected said slats each having an upper article supporting surface;

said supporting surfaces being located between the body surface and the lower side of articles on said carrier;

a pair of bracket members disposed upon said selected slats and a restraining bar extending laterally between and secured adjacent its opposite ends to said bracket members;

means on each of said bracket members and cooperable with one of said selected slats for detachably securing and longitudinally adjusting said bracket members and said restraining bar at infinite positions along said slats;

means comprising a locking member being manually rotated in a direction transverse to said slat between a closed and open position for locking and unlocking said bracket member at a position along said slat;

an elongated, one-piece spring member operatively connected to said locking member and extending transversely to said slat for engaging and disengaging said slat as said locking member is rotated, said spring member being operable to flex to enable a portion thereof to abuttingly engage a portion of said bracket member to further tension said bracket member in releasably locking engagement with said slat;

article securing means extending inwardly from said selected slats for allowing articles to be secured upon said slats.

16. An article carrier for an automobile comprising:

a plurality of parallel slats fixedly secured on a generally horizontally extending exterior automobile body surface;

said slats extending generally longitudinally of the automobile;

a plurality of selected said slats having an upper article supporting surface;

said supporting surfaces being located between the body surface and the lower side of articles on said carrier;

a pair of bracket members disposed upon said selected slats and a restraining bar extending laterally between and secured adjacent its opposite ends to said bracket members;

means on each of said bracket members and cooperable with one of said selected slats for detachably securing and longitudinally adjusting said bracket members and said restraining bar at infinite positions along said slats;

means comprising a locking member being manually rotated in a direction transverse to said slat between a closed and an open position for locking and unlocking said bracket member at a position along said slat; and a latching and spring member operatively connected to said locking member slat for movement as said locking member is rotated to engage and disengage said slat and for cooperating with said bracket member to flex and abuttingly engage a portion of said bracket member to thereby tension said bracket member toward said slat.

* * * * *

UNITED STATES PATENT AND TRADEMARK OFFICE
CERTIFICATE OF CORRECTION

PATENT NO. : 5,082,158
DATED : January 21, 1992
INVENTOR(S) : John A. Bott

It is certified that error appears in the above-indentified patent and that said Letters Patent is hereby corrected as shown below:

Column 6, line 26, claim 16, after "of" delete "parallel".
          line 45, claim 16, before "means", insert ––said––.
          line 47, claim 16, after "and", delete "an".

Signed and Sealed this

Fourth Day of January, 1994

*Attest:*

BRUCE LEHMAN

*Attesting Officer*    *Commissioner of Patents and Trademarks*